United States Patent Office 3,819,632
Patented June 25, 1974

3,819,632
NAPHTHOYLENE-BENZIMIDAZOLE AND NAPHTHALOPERINONE
Kurt Burdeska, Basel, Switzerland, assignor to Ciba-Geigy AG, Basel, Switzerland
No Drawing. Filed Nov. 30, 1971, Ser. No. 203,485
Claims priority, application Switzerland, Dec. 1, 1970, 17,771/70
Int. Cl. C07d 34/00
U.S. Cl. 260—282        6 Claims

ABSTRACT OF THE DISCLOSURE

Perinone dyestuffs of the formula

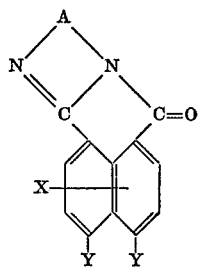

wherein A is phenylene or naphthalene, X is hydroxy, alkoxy of 1 to 4 carbon atoms, phenoxy, nitro or alkanoylamino of 1 to 4 carbon atoms, one Y is a hydrogen atom and the other Y is

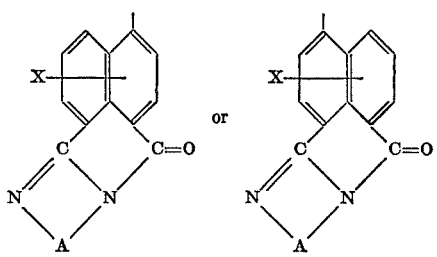

wherein A and X have the meanings assigned to them hereinbefore are useful for coloring plastics in yellow shades of outstanding fastness properties.

The present invention is based on the observation that new perinone dyestuffs of the formula

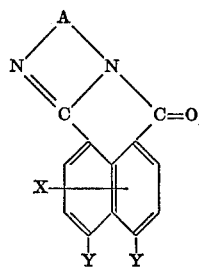

wherein A represents a carbocyclic or heterocyclic aromatic radical in which both nitrogen atoms are in ortho- or periposition to each other, X represents a hydrogen atom or a substituent that does not impart solubility in water, for example a halogen atom, a hydroxy or alkoxy group, for example one containing 1–4 carbon atoms, a phenoxy, nitro or acylamino group, for example an alkanoylamino group containing 1–4 carbon atoms or a benzoylamino group which is optionally substituted by halogen atoms, alkyl or alkoxy groups containing 1–4 carbon atoms, or in particular a hydrogen atom, one Y represents a hydrogen atom and the other Y represents a radical of the formula

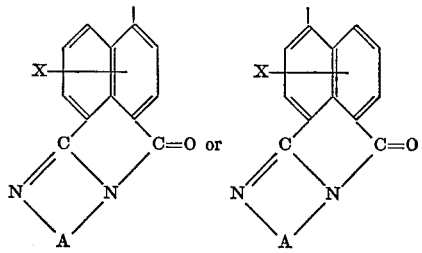

wherein A and X have the meanings given above, are obtained by condensing a carboxylic acid anhydride of the formula

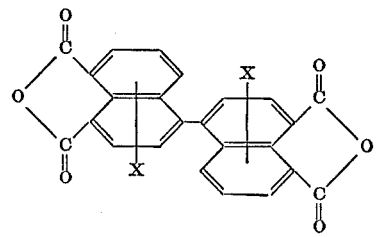

wherein X has the meaning given above, or the corresponding tetracarboxylic acid, with an ortho- or peri-arylenediamine in the molar ratio 1:2.

Particular interest attaches to dyestuffs of the formula

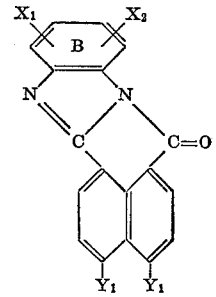

wherein $X_1$ and $X_2$ represent hydrogen or halogen atoms, alkyl, alkoxy, phenoxy, phenylmercapto, alkylsulphonyl or acylamino groups, containing 1–4 carbon atoms, or represent nitro, cyano or carboxylic acid ester groups or wherein the radicals $X_1$ and $X_2$ together with two vicinal carbon atoms of the benzene ring B form a fused benzene or hetero ring, one $Y_1$ represents a hydrogen atom and the other $Y_1$ represents a radical of the formula

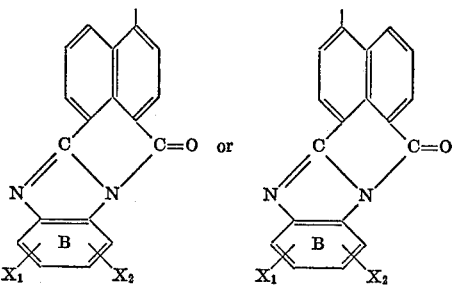

The 4,4′-dinaphthyl-1,1′,8,8′-tetracarboxylic acid dianhydrides used as starting materials constitute in part new compounds which can be obtained by condensing 4-bromonaphthalic acid with copper powder in an inert organic solvent according to the process of Ullmann.

Suitable diamines are, on the one hand, o-arylenediamines, in particular o-phenylenediamines, preferably those of the formula

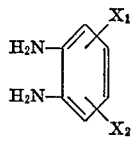

wherein $X_1$ and $X_2$ have the meaning given above. In this case dyestuffs of the naphthoylene-benzimidazole series are obtained. On the other hand, it is also possible to use periarylenediamines, especially 1,8-naphthylenediamines. In this case dyestuffs of the naphthaloperinone series are obtained.

As examples of diamines there may be cited:

1,2-diaminobenzene
1,2-diamino-4-chlorobenzene
1,2-diamino-4-bromobenzene
1,2-diamino-4,5-dichlorobenzene
1,2-diamino-3,4,6-trichlorobenzene
1,2-diamino-3-methylbenzene
1,2-diamino-4-methylbenzene
1,2-diamino-3,5-dimethylbenzene
1,2-diamino-4,5-dimethybenzene
1,2-diamino-4-methoxybenzene
1,2-diamino-4-phenoxybenzene
1,2-diamino-4-p-chlorophenoxybenzene
1,2-diamino-4,5-dimethoxybenzene
1,2-diamino-4-ethoxybenzene
1,2-diamino-4-β-hydroxyethoxybenzene
1,2-diamino-4-phenylmercaptobenzene
1,2-diamino-4-nitrobenzene
1,2-diamino-4-cyanobenzene
1,2-diamino-4-acetylaminobenzene
1,2-diamino-4-benzoylaminobenzene
1,2-diamino-4-methylsulphonyl-benzene
1,2-diamino-4-ethylsulphonyl-benzene
1,2-diamino-4-carbomethoxybenzene
1,2-diamino-4-carbethoxybenzene
3,4-diamino-diphenyl
1,2-diamino-naphthalene
2,3-diamino-naphthalene
1,2-diamino-5,6,7,8-tetrahydronaphthalene
2,3-diamino-5,6,7,8-tetrahydronaphthalene
1,2-diamino-anthraquinone
2,3-diamino-anthraquinone
9,10-diamino-phenanthrene
3,4-diamino-pyridine
2,3-diamino-diphenylene oxide
2-methyl-5,6-diamino-benzimidazole
1,8-diamino-naphthalene
5,6-diamino-acenaphthalene The condensation is advantageously carried out by heating in an organic solvent, for example chlorobenzene, nitrobenzene, dimethyl formamide or, in particular, glacial acetic acid.

The resulting condensation products can be isolated by filtration from the reaction mixture. In many cases it is advantageous to purify the products by heating them in dilute sodium carbonate solution. They constitute valuable yellow to red dyestuffs which can be used in finely divided form, for example as disperse dyestuffs for polyester fibers, but in particular for the dope dyeing or coloring of high molecular weight organic material, for example cellulose ethers and esters, nitrocellulose, natural resins or synthetic resins, for example aminoplasts, in particular urea- and melamine-formaldehyde resins, alkyl resins, phenolic plastics, polycarbonates, polyvinyl, chloride, polyamides, polyacrylonitrile, polyacrylic ester, polybutadiene, acrylonitrile-butadiene-styrene-copolymers, rubber, casein, silicone and silicone resins, individually or in admixture.

Due to their good heat stability the dyestuffs according to the invention are very suitable for color high-melting subsance in the melt, for example polyolefines, such as polyethylene, polypropylene, polystyrene, polyamides and, in particular, linear polyester. The colored melts can be pressed to films or fibers, or cast in sheets. The colorations obtained are distinguished by excellent fastness to light and migration, great tinctorial strength and purity of shade.

In comparison with the perinone dyestuffs which are derived from 1,8-naphthalene-dicarboxylic acid, the dyestuffs according to the invention are distinguished in the dope coloration of polyester by substantially greater tinctorial strength, purity and brilliance.

The following Examples illustrate the invention, the parts being by weight unless otherwise stated.

EXAMPLE 1

11.83 Parts of 4,4'-dinaphthyl-1,1',8,8'-tetracarboxylic acid dianhydride and 200 parts by volume of glacial acetic acid are heated to 110° C. A solution (heated to 110° C.) of 7.85 parts of 1,2-diamino-4-methyl-benzene in 50 parts of glacial acetic acid is passed rapidly into the resulting suspension. After a short time the suspension turns yellow and is then heated for 12 hours under reflux, Subsequently the precipitated yellow dyestuff of the probable formula

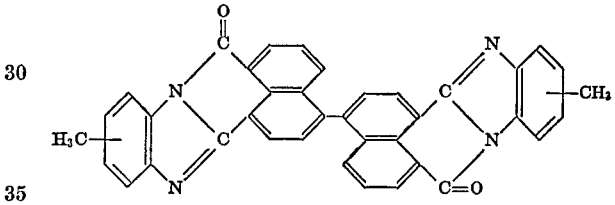

is filtered off, washed with hot glacial acetic and then with water.

The product is purified by heating it for 30 minutes to 85–90° C. in 300 parts by volume of a 5% aqueous sodium carbonate solution. It is filtered off while hot, washed with hot water until free of alkali and dried at 100° C. in vacuo. The yield is 12.4 parts. The dyestuff colors linear polyester in brilliant greenish yellow shades of excellent fastness to light and migration.

The 4,4'-dinaphthyl-1,1',8,8'-tetracarboxylic acid dianhydride used for the synthesis of the above dyestuff was prepared in the following manner:

350 parts by volume of dimethyl formamide and 20 parts of copper powder are heated to the boil and 50 parts by volume are distilled therefrom. The distillate is then cooled to 110° C. and 1 g. of iodine is added. The mixture is heated to the boil once more and kept for 20 minutes at the boil. The temperature is then allowed to fall to about 10° C. and then 55.4 parts of 4-bromo-naphthalic anhydride are added. The solution is kept at the boil for 48 hours, then filtered hot and the filtrate treated with water. The precipitated product is filered off, washed with water and then suspended in 800 ml. of water.

The suspension is heated to 80–85° C. and then carefully rendered alkaline to phenolphthalein with sodium carbonate, and filtered. The filtrate is acidified with 15% hydrochloric acid, the precipitated product filtered off cold, washed with water and dried at 120° C. in vacuo. The yield is 30–35 parts. The finely ground product is purified by heating it in 210 ml. of glacial acetic acid for 1 hour to the boil, filtered the mixture hot, washing the filtrate with hot glacial acetic acid, washing it with water and drying it in vacuo at 120° C. The product can be recrystallized from nitrobenzene. The melting point is higher than 360° C.

If the reaction is carried out in dimethyl sulphoxide instead of dimethyl formamide, the 4,4'-dinaphthyl-1,1',8, 8'-tetracarboxylic acid dinyhydride is obtained in approx. 85% yield after a 24 reaction period. The pure dianhydride, which is recrystallized from nitrobenzene or dimethyl formamide, melts at 378° C.

The following table lists further dyestuffs which are obtained if, in accordance with the process described in paragraph 1, 1 mol of 4,4'-dinaphthyl-1,1',8,8'-tetracarboxylic acid dianhydride is condensed with 2 mols of the diamine listed in column I. Column II indicated the shade of a 0.05% coloration in a 2 mm. thick polyethylene terephthalate injection molded sheet.

TABLE I

| No. | I Diamino compound | II Shade |
|---|---|---|
| 2 | 1,2-diaminobenzene | Greenish yellow. |
| 3 | 1,2-diamino-4-chlorobenzene | Do. |
| 4 | 1,2-diamono-4,5-dichlorobenzene | Do. |
| 5 | 1,2-diamino-3,4,6-trichlorobenzene | Do. |
| 6 | 1,2-diamino-4,5-dimethylbenzene | Do. |
| 7 | 1,2-diamino-4-methoxybenzene | Reddish yellow. |
| 8 | 1,2-diamino-4,5-dimethoxybenzene | Orange. |
| 9 | 1,2-diamino-4-acetylaminobenzene | Reddish yellow. |
| 10 | 1,2-diamino-4-benzoylaminobenzene | Do. |
| 11 | 1,2-diamino-naphthalene | Do. |
| 12 | 1,8-diamino-naphthalene | Do. |
| 13 | 5,6-diamino-acenaphthene | Red. |
| 14 | 9,10-diamino-phenanthrene | Reddish yellow. |
| 15 | 1,2-diamino-4-nitrobenzene | Do. |
| 16 | 1,2-diamino-4-ethylsulphonylbenzene | Greenish yellow. |
| 17 | 1,2-diamino-4-phenoxybenzene | Yellow. |
| 18 | 3,4-diaminodiphenyl | Do. |
| 19 | 2,3-diaminodiphenyleneoxide | Do. |
| 20 | 2-methyl-5,6-diaminobenzimidazole | Orange. |
| 21 | 1,2-diamino-4-chloro-5-(4'-chlorophenylmercapto) benzene. | Reddish yellow. |
| 22 | 1,2-diamino-4-chloro-5-(4'-methoxyphenoxy)-benzene | Do. |

EXAMPLE 23

11.4 grams of 4,4'-dinaphthyl-3,3'-dimethoxy-1,1',8,8'-tetracarboxylic acid dianhydride and 180 parts by volume of glacial acetic acid are heated to 110–115° C. Into the resulting suspension is passed a solution of 9.5 g. of 1,8-diamino-naphthalene dissolved in 20 parts by volume of glacial acetic acid. For a brief time a solution is formed from which red crystals then precipitate. The batch is kept at the boil overnight, then filtered hot and the filtrate is washed with hot glacial acetic acid and then with water. The precipitated product of the formula

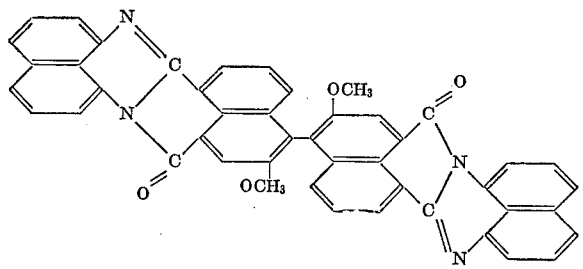

is purified with dilute sodium carbonate solution, as described in Example 1. 15.4 grams of reddish brown crystals are so obtained. The dyestuff colors linear polyester in red shades of excellent fastness to light and migration.

EXAMPLE 24

A red dyestuff is likewise obtained if in the reaction 11.6 g. of 4,4'-dinaphthyl-3,3'-dichloro-1,1',8,8'-tetracarboxylic acid dianhydride is used instead of the 11.4 g. of 4,4'-dinaphthyl-3,3'-dimethoxy - 1,1,8,8' - tetracarboxylic acid dianhydride. The 4,4'-dinaphthyl-3,3'-dichloro-1,1',8,8'-tetracarboxylic acid dianhydride was obtained in analogous fashion as described in the case of 4,4'-dinaphthyl-1,1',8,8'-tetracarboxylic acid anhydride, by reacting 3-chloro-4-bromo-naphthalic anhydride in dimethyl sulphoxide with copper powder. Colorless crystals are obtained on crystallization from nitrobenzene. The melting point lies above 360° C. The dyestuff colors linear polyester in red shades of excellent fastness to light and migration.

EXAMPLE 25

12.78 grams of 4,4'-6,6'-dihydroxy-1,1',8,8'-tetracarboxylic acid anhydride, 9.8 g. of 1,2-diamino-4,5-dimethylbenzene and 150 ml. of dimethyl formamide are heated for 30 minutes to 100° C. A greenish yellow solution forms which is subsequently heated for 7 hours to the boil. During this time yellow crystals are deposited. The reaction mixture is filtered at 100° C., the filtrate washed with dimethyl formamide and then with alcohol, and dried at 120° C. in vacuo. 16.3 grams of yellow crystal of the formula

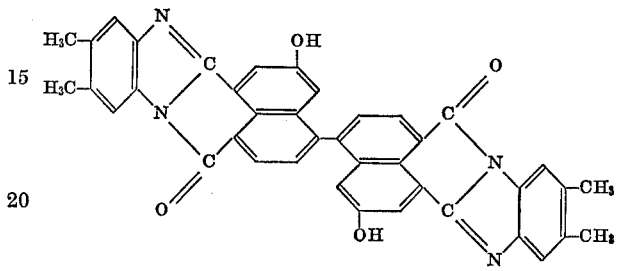

are obtained. The dyestuff colors linear polyesters in reddish yellow shades of excellent fastness to light and migration. The 4,4'-dinaphthyl-6,6'-dihydroxy-1,1',8,8'-tetracarboxylic acid anhydride was prepared in the following way:

100 g. of 4,4'-dinaphthyl-1,1',8,8'-tetracarboxylic acid dianhydride are dissolved in 1000 g. of oleum and the solution is heated for 5 hours to 90–95° C. The sulphonated mixture is thereupon passed in a thin stream and with good stirring into 9000 ml. of water. The resulting solution is heated to 85° C. and then decomposed with 2100 g. of sodium chloride, when the disodium salt of the disulphonic acid slowly precipitates. The batch is allowed to cool while stirring, filtered, and the filtrate washed with 15% sodium chloride solution until neutral and dried at 120° C. in vacuo. The yield is 157 g.

940 grams of potassium hydroxide and 30 g. of water are heated to 180° C. To the resulting melt are added 156 g. of finely pulverized disodium salt in 15 minutes. The melt is heated for 20 minutes to 220–225° C. and then cooled to 140° C. It is then carefully introduced into 2000 ml. of water and the resulting not quite clear yellow solution is filtered and then hydrochloric acid is added until an acid reaction to Congo red is attained. The precipitated yellowish brown product is filtered while still hot, washed with hot water and dried in vacuo at 120° C. to yield 98 g. of 4,4'-dinaphthyl-6,6'-dihydroxy-1,1',8,8'-tetracarboxylic acid dianhydride. The product crystallizes from cyclohexanone in the form of yellow crystals. The melting point is 433° C.

EXAMPLE 26

13.63 grams 4,4'-dinaphthyl - 6,6' - dimethoxy-1,1',8,8'-tetracarboxylic acid dianhydride, 10.3 g. of 4-chloro-1,2-diaminobenzene and 180 ml. of dimethyl formamide are heated for 1 hour at 100° C. and thereafter for 16 hours to the boil. A greenish yellow solution forms from which fine yellow crystals precipitate in the course of this time. These are filtered and dried at 120° C. in vacuo. 14.6 g. of the dyestuff of the formula

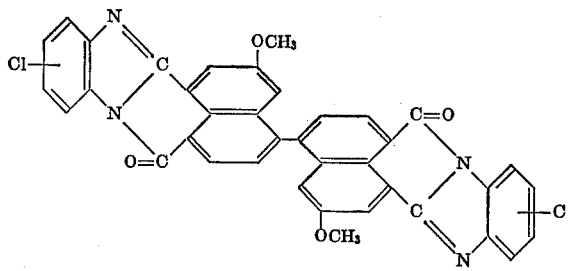

are obtained. It colors linear polyester in brilliant greenish yellow shades of excellent fastness to light and migration. The 4,4'-dinaphthyl - 6,6'-dimethoxy-1,1',8,8'-tetracarboxylic acid dianhydride, was prepared from 4,4'-dinaphthyl-6,6'-dihydroxy-1,1',8,8'-tetracarboxylic acid dianhydride by methylation with dimethyl sulphate in known manner. It crystallizes from nitrobenzene in the form of faintly yellow crystals (m.p. 399° C.).

EXAMPLE 27

14.6 grams of 4,4'-dinaphthyl-dinitro-1,8,1',8'-tetracarboxylic acid dianhydride and 220 parts by volume of glacial acetic acid are heated to 110–115° C. Into the resulting suspension is quickly passed with rapid stirring a solution of 8.1 g. of 1,2-phenylenediamine dissolved in 30 parts by volume of glacial acetic acid, in the process of which a solution is formed from which yellow crystals are deposited after a brief time. The batch is stirred overnight under reflux, then filtered hot. The filtrate is washed with hot glacial acetic acid and then with water. The product is purified with dilute sodium carbonate solution, as described in Example 1, to yield 17.5 g. of yellow crystals of the formula

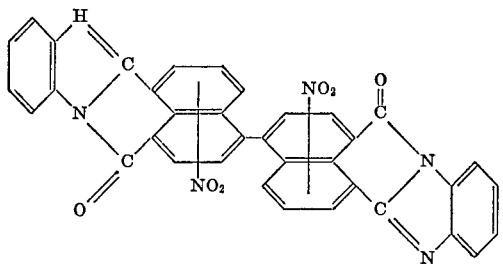

The product crystallizes from nitrobenzene in the form of reddish yellow crystals and colors linear polyester in reddish-yellow shades of excellent light fastness.

The 4,4'-dinaphthyl-dinitro-1,8,1',8'-tetracarboxylic acid dianhydride was prepared in the following way. 59.1 grams of 4,4'-dinaphthyl-1,8,1',8'-tetracarboxylic acid dianhydride are dissolved at 10° C. in 590 g. of monohydrate. Into the resulting solution is passed in 1 hour 40 g. of nitrosulphuric acid at 3–8° C. The mixture is stirred overnight at 5–10° C. and then poured on 1500 g. of ice while stirring. The precipitated product is stirred for 20 minutes at room temperature, then filtered and washed with water until neutral. The product is dried, heated with 250 ml. of acetic anhydride for 1 hour to the boil. The mixture is then cooled, filtered, and the filtrate washed with acetic acid and then with water. The 4,4'-dinaphthyl-dinitro-1,8,1',8'-tetracarboxylic acid dianhydride is so obtained in a yield amounting to 95% of theory.

EXAMPLE 28

13.72 grams of 4,4'-dinaphthyl-diacetylamino-1,1',8,8'-tetracarboxylic acid dianhydride, 7.9 g. of 3,4-diaminotoluene and 160 ml. of dimethyl formamide are heated for 1 hour to 80–90° and subsequently for 14 hours under reflux. The dyestuff of the formula

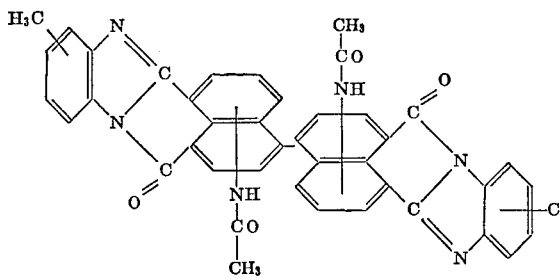

precipitates from the initially greenish yellow solution in the course of this time in the form of reddish yellow crystals. After cooling to 100° C., filtering, washing the filtrate with dimethyl formamide and alcohol and drying it at 120° C., the product is obtained in a yield of 12.5 g. The dyestuff colors polyester fibers in reddish yellow shades of excellent fastness properties. The 4,4'-dinaphthyl-diacetylamino - 1,1',8,8' - tetracarboxylic acid dianhydride was obtained by reducing the 4,4'-dinaphthyl-dinitro-1,1',8,8'-tetracarboxylic acid dianhydride to the 4,4'-dinaphthyl-diamino-1,1',8,8'-tetracarboxylic acid dianhydride and subsequently acetylating the latter with acetic anhydride.

EXAMPLE 29

If 4,4'-dinaphthyl-dibenzoylamino-tetracarboxylic acid dianhydride (in equimolar amounts) is used as starting material instead of 4,4'-dinaphthyl-diacetylamino-tetracarboxylic acid dianhydride and the process is otherwise carried out as described in Example 26, a dyestuff which colors linear polyesters in reddish yellow shades is likewise obtained.

EXAMPLE 30

0.5 part of the dyestuff obtained according to Example 1 is thoroughly mixed with 1000 parts of polyethylene terephthalate granules (diameter: 1–2 mm.) in a mixing drum rotating at 70 revolutions per minutes for 10 minutes. The dry colored granules are subsequently processed at 270° C. in an injection-extrusion molding machine to yield sheets which are colored a strong and pure greenish yellow shade. The coloration is outstanding fast to heat and very fast to light.

EXAMPLE 31

1000 parts of polyethylene terephthalate granules and 1 part of triethyl phosphate are thoroughly mixed in a mixing drum. Upon addition of 2.5 parts of the dyestuff obtained according to Example 6, mixing is continued for 15 minutes and the contents are then dried for 12 hours at 120° C. The thus treated granules are spun at 250–275° C. according to the melt spinning process to yield fibres which are colored a strong and pure greenish yellow shade and possess very good fastness to light, washing, chlorine and migration.

EXAMPLE 32

2 parts of the dyestuff obtained according to Example 2 in 2000 parts of water which contains 4 parts of oleyl polyglycol ether are finely dispersed in a pressure dyeing apparatus. The pH of the dyebath is adjusted to 6–6.5 with acetic acid. 100 parts of fabric made from polyethylene glycol terephthalate are put into the bath at 50° C. The bath is heated to 130° C. within 30 minutes and the fabric is dyed for 50 minutes at this temperature. The dyed goods are subsequently rinsed with water, scaped and dried. By observing these conditions a greenish yellow dyeing is obtained which is fast to washing, light and sublimation.

EXAMPLE 33

1 gram of the dyestuff manufactured according to Example 3 is thoroughly mixed in a mixing drum with 1000 parts of polystyrene granules. The granules which are thus colored dry on the surface are processed at 220° C. in an injection-extrusion molding machine to yield greenish yellow colored sheets. The coloration has very good fastness to heat and light.

EXAMPLE 34

1 part of the dyestuff manufactured according to Example 3 is thoroughly mixed in a mixing drum with 1000 parts of polypropylene granules. The granules which are colored dry on the surface are then processed at 260° C. in an injection-extrusion molding machine to yield sheets which are colored a strong greenish yellow. The coloration is very fast to heat and light.

EXAMPLE 35

1000 parts of acrylobutadiene styrene granules and 1 part of the dyestuff manufactured according to Example 3 are thoroughly mixed for 10 minutes in a mixing drum rotating at 70 revolutions per minute. The dry colored granules are then processed at 250° C. in an injection-extrusion molding machine to yield sheets which are colored a strong greenish yellow shade. The colorations are very fast to heat and light.

EXAMPLE 36

1000 parts of polyamide 6 granules and 5 parts of the dyestuff manufactured according to Example 6 were thoroughly mixed in a mixing drum and subsequently dried for 24 hours at 100° C. in vacuo. The thus treated granules are spun at 270° C. by the melt spinning process to yield fibers dyed a strong and pure yellow shade and which are very fast to light.

I claim:

1. A perinone dyestuff of the formula

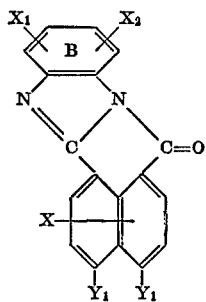

wherein: X is hydroxy, alkoxy of 1 to 4 carbon atoms, phenoxy, nitro or alkanoylamino of 1 to 4 carbon atoms, $X_1$ is hydrogen, halogen, alkyl of 1 to 4 carbon atoms, alkoxy of 1 to 4 carbon atoms, phenoxy, alkyl phenoxy of 1 to 4 carbon atoms, chlorophenoxy, alkoxy phenoxy of 1 to 4 carbon atoms, phenylmercapto, chlorophenylmercapto, alkylphenylmercapto of 1 to 4 carbon atoms, alkylsulphonyl of 1 to 4 carbon atoms, alkanoylamino of 1 to 4 carbon atoms, nitro, cyano or carbalkoxy of 1 to 4 carbon atoms, $X_2$, is hydrogen, halogen, methyl, methoxy or wherein the radicals $X_1$ and $X_2$ together with the benzene ring B form naphthalene, one Y is hydrogen and the other Y is

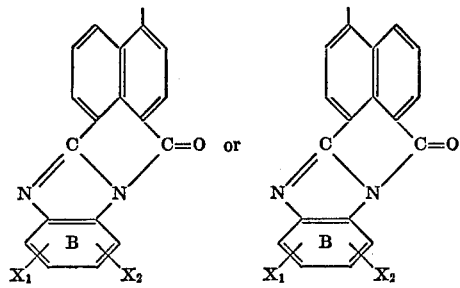

wherein B, $X_1$ and $X_2$ have the above meanings.

2. A compound as claimed in claim 1 of the formula

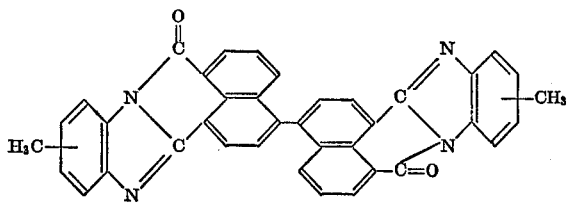

3. The compound as claimed in claim 1 of the formula

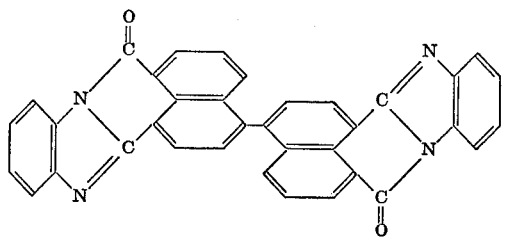

4. A compound as claimed in claim 1 of the formula

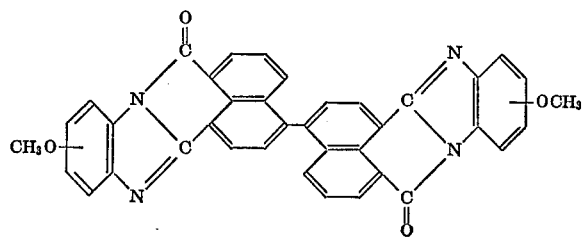

5. The compound as claimed in claim 1 of the formula

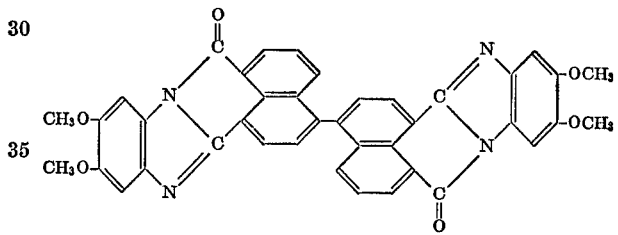

6. The compound as claimed in claim 1 of the formula

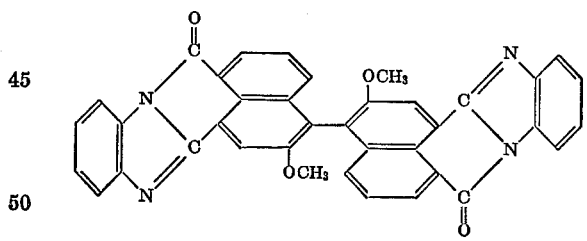

References Cited

UNITED STATES PATENTS

| | | | |
|---|---|---|---|
| 2,998,402 | 8/1961 | Geiger | 260—282 |
| 3,446,810 | 5/1969 | Dien | 260—281 |
| 3,544,573 | 12/1970 | Christmann | 260—282 |
| 3,103,403 | 9/1963 | Eaton et al. | 260—282 |
| 3,308,127 | 3/1967 | Senshu I | 260—282 |
| 3,330,834 | 7/1967 | Senshu et al. | 260—287 |
| 3,444,172 | 5/1967 | Senshu II | 260—282 |

FOREIGN PATENTS

| | | | |
|---|---|---|---|
| 1,445,775 | 3/1969 | Germany | 260—281 |

DONALD G. DAUS, Primary Examiner

U.S. Cl. X.R.

8—179; 260—37 R, 37 N, 37 NP, 345.2